(12) United States Patent
Asnaashari et al.

(10) Patent No.: US 8,966,164 B1
(45) Date of Patent: **\*Feb. 24, 2015**

(54) STORAGE PROCESSOR MANAGING NVME LOGICALLY ADDRESSED SOLID STATE DISK ARRAY

(71) Applicant: Avalanche Technology, Inc., Fremont, CA (US)

(72) Inventors: Mehdi Asnaashari, Danville, CA (US); Siamack Nemazie, Los Altos Hills, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,274

(22) Filed: Oct. 9, 2013

Related U.S. Application Data

(63) Continuation-in-part of application No. 14/040,280, filed on Sep. 27, 2013.

(51) Int. Cl.
*G06F 12/06* (2006.01)
*G06F 3/06* (2006.01)

(52) U.S. Cl.
CPC .......... *G06F 3/0659* (2013.01); *G06F 3/0619* (2013.01); *G06F 3/0688* (2013.01)

USPC .......................................... 711/103; 711/157

(58) Field of Classification Search
USPC .................................. 711/103, 157
See application file for complete search history.

(56) References Cited

U.S. PATENT DOCUMENTS

| | | | |
|---|---|---|---|
| 2008/0183947 A1* | 7/2008 | Shone et al. ................... | 711/103 |
| 2008/0320214 A1* | 12/2008 | Ma et al. ........................ | 711/103 |
| 2012/0203993 A1* | 8/2012 | Virgin et al. ................... | 711/165 |
| 2012/0266050 A1* | 10/2012 | Cideciyan et al. ............ | 714/773 |
| 2013/0198311 A1* | 8/2013 | Tamir et al. ................... | 709/212 |

OTHER PUBLICATIONS

NVMHCI Workgroup, "NVM Express" Oct. 11, 2012 Intel Corporation, Revision 1.1, all pages.*
NVM Express, Revision 1.1, Amber Huffman, Intel Corporation, Oct. 11, 2012.

\* cited by examiner

*Primary Examiner* — Kenneth Lo
(74) *Attorney, Agent, or Firm* — Maryam Imam; IPxLaw Group LLP (57) ABSTRACT

A method of writing to one or more solid state disks (SSDs) employed by a storage processor includes receiving a command, creating sub-commands from the command based on a granularity, and assigning the sub-commands to the one or more SSDs and creating a NVMe command structure for each sub-command.

30 Claims, 10 Drawing Sheets

| Bytes | Description |
|---|---|
| 63:60 | Command Dword 15 (CDW15): This field is command specific Dword 15. |
| 59:56 | Command Dword 14 (CDW14): This field is command specific Dword 14. |
| 55:52 | Command Dword 13 (CDW13): This field is command specific Dword 13. |
| 51:48 | Command Dword 12 (CDW12): This field is command specific Dword 12. |
| 47:44 | Command Dword 11 (CDW11): This field is command specific Dword 11. |
| 43:40 | Command Dword 10 (CDW10): This field is command specific Dword 10. |
| 39:24 | If CDW0[15] is cleared to '0', then the definition of this field is: <table><tr><td>39:32</td><td>PRP Entry 2 (PRP2): This field contains the second PRP entry for the command or if the data transfer spans more than two memory pages, then this field is a PRP List pointer.</td></tr><tr><td>31:24</td><td>PRP Entry 1 (PRP1): This field contains the first PRP entry for the command or a PRP List pointer depending on the command.</td></tr></table> If CDW0[15] is set to '1', then the definition of this field is: <table><tr><td>39:24</td><td>SGL Entry 1 (SGL1): This field contains the first SGL segment for the command. If the SGL segment is a Data Block descriptor, then it describes the entire data transfer. If more than one SGL segment is needed to describe the data transfer, then the first SGL segment is a Segment, or Last Segment descriptor. Refer to section 4.4 for the definition of SGL segments and descriptor types.</td></tr></table> |

Fig. 7a

| Bytes | Description |
|---|---|
| 23:16 | If CDW0[15] is cleared to '0', then the definition of this field is:<br><br>Metadata Pointer (MPTR): This field contains the address of a contiguous physical buffer of metadata. This field is only used if metadata is not interleaved with the logical block data, as specified in the Format NVM command. This field shall be Dword aligned.<br><br>If CDW0[15] is set to '1', then the definition of this field is:<br><br>Metadata SGL Segment Pointer (MSGLP): This field contains the address of an SGL segment which describes the metadata to transfer. This field is only used if metadata is not interleaved with the logical block data, as specified in the Format NVM command. This field shall be Qword aligned. Refer to section 4.4. |
| 15:08 | Reserved |
| 07:04 | Namespace Identifier (NSID): This field specifies the namespace that this command applies to. If the namespace is not used for the command, then this field shall be cleared to 0h. If a command shall be applied to all namespaces on the device, then this value shall be set to FFFFFFFFh. |
| 03:00 | Command Dword 0 (CDW0): This field is common to all commands and is defined in Figure 10. |

STORAGE PROCESSOR MANAGING NVME LOGICALLY ADDRESSED SOLID STATE DISK ARRAY

CROSS-REFERENCE TO RELATED APPLICATIONS

This application is a continuation-in-part of U.S. patent application Ser. No. 14/040,280, filed on Sep. 27, 2013, by Mehdi Asnaashai, and entitled "STORAGE PROCESSOR MANAGING SOLID STATE DISK ARRAY".

BACKGROUND OF THE INVENTION

1. Field of the Invention

This invention relates generally to solid state disks and particularly to addressing schemes used by solid state disks.

2. Description of the Prior Art

With the advent of the popularity of solid state drives (SSDs) and exponential growth of network content, the emergence of all-flash storage systems such as, SSD arrays, or storage appliances has been realized. These systems or appliances are mostly network attached storage (NAS) or storage attached network (SAN) via a high-speed, high bandwidth network such as a 10 Giga bit Ethernet (10 GbE). These storage units typically include arrays of one or more SSDs to meet the requisite capacity and performance.

This popularity has also led to the creation of a Non-Volatile Memory (NVM) Express (NVMe) revision 1.1 Specification dated Oct. 11, 2012 for Peripheral Component Interconnect Express (PCIe) SSDs.

One of the exiting problems with designing of a storage appliance is the complexity and cost associated with designing the proprietary array of SSDs for use in the storage appliance.

Thus, there is a need for a low-cost high-performance storage appliance with improved performance without spending tremendous effort developing the array of SSDs.

SUMMARY OF THE INVENTION

Briefly, a method includes writing to one or more solid state disks (SSDs) employed by a storage processor. The method includes receiving a command, creating sub-commands from the command based on a granularity, and assigning the sub-commands to the SSDs, and creating NVMe command structures for the sub-commands.

These and other objects and advantages of the invention will no doubt become apparent to those skilled in the art after having read the following detailed description of the various embodiments illustrated in the several figures of the drawing.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

Figure 1:
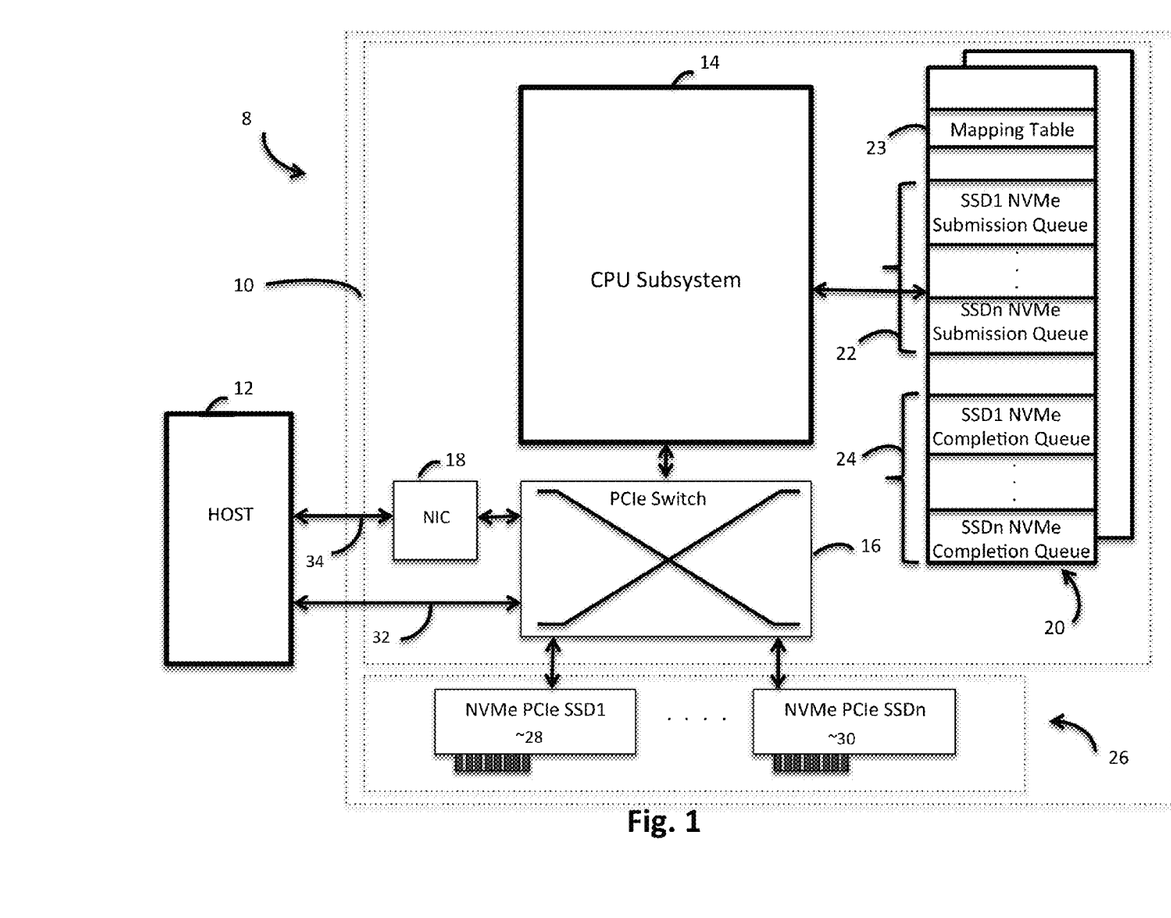
FIG. 1 shows a storage system 8 in accordance with an embodiment of the invention.

Referring now to FIG. 1, a storage system (or "appliance") 8 is shown in accordance with an embodiment of the invention. The storage system 8 is shown to include storage processor 10 and a bank of solid state drives (SSDs) 26. The storage system 8 is shown coupled to a host 12. The SSDs 26 of the storage system 8 are each shown to be a non-volatile memory express (NVM) Express (NVMe) Peripheral Component Interconnect Express (PCIe) solid state disks (SSDs) among a bank of NVMe PCIe SSDs 26.

The storage processor 10 is shown to include a CPU subsystem 14, a PCIe switch 16, a network interface card (NIC) 18, and memory 20. The memory 20 is shown to include NVMe submission queues 22, NVMe completion queues 24, and mapping table 23. The storage processor 10 is further shown to include an interface 34 and an interface 32.

The host 12 is shown coupled to the NIC 18 through the interface 34 and/or coupled to the PCIe switch 16 through the interface 32. The PCIe switch 16 is shown coupled to the bank of NVMe PCIe SSDs 26. The PCIe switch 16 is shown coupled to the bank of NVMe PCIe SSDs 26 which are shown to include 'n' number of NVMe PCIe SSDs or NVMe PCIe SSD 28 through NVMe PCIe SSDn 30 with the understanding that the bank of SSDs 26 may have additional SSDs than that which is shown in the embodiment of FIG. 1. "n" is an integer value. The PCIe switch 16 is further shown coupled to the NIC 18 and the CPU subsystem 14. The CPU subsystem 14 is shown coupled to the memory 20. It is understood that the memory 20 may and typically does store additional information, not depicted in FIG. 1.

In an embodiment of the invention, the memory 20 is volatile, such as dynamic random access memory (DRAM). In other embodiments, part or all of the memory 20 is non-volatile, such as flash, magnetic random access memory (MRAM), spin transfer torque magnetic random access memory (STTMRAM), resistive random access memory (RRAM), or phase change memory (PCM). In still other embodiments, the memory 20 is made of both volatile and non-volatile memory. It is desirable to save the queues 22 and 24 in non-volatile memory so as to maintain the information that is saved therein even when power is not applied to the memory 20. As will be evident shortly, maintaining the information in memory at all times is of particular importance because the information maintained in the queues 22 and 24 is needed for proper operation of the storage system subsequent to a power interruption.

During operation, the host 12 issues a read or a write command, along with data in the case of the latter. Information from the host is normally transferred between the host 12 and the processor 10 through the interfaces 32 and/or 34. For example, information is transferred through the interface 34 between the processor 10 and the NIC 18. Information between the host 12 and the PCIe switch 16 is transferred using the interface 34 and under the direction of the of the CPU subsystem 14.

In the case where data is to be stored, i.e. a write operation is consummated, the CPU subsystem 14 receives the write command and accompanying data for storage from the host through the PCIe switch 16, under the direction of the CPU subsystem 14. The received data is ultimately saved in the memory 20. The host write command typically includes a starting LBAs and the number of LBAs (sector count) that the host intents to write to. The starting LBA in combination with sector count is referred to herein as "host LBAs" or "host provided LBAs". The storage processor 10 or the CPU subsystem 14 maps the host-provided LBAs to the bank of NVMe PCIe SSDs 26.

Prior to the foregoing mapping by the CPU subsystem 14, the host write command is divided or broken up into one or multiple write commands based on the number LBAs that the host intents to write to and a granularity at which the data is striped across the array of SSDs 26. Data striping is the technique of segmenting logically sequential data across different SSDs. The combination of host-provided starting LBA and the sector count; host LBA, associated with a command is divided into one or more LBAs based on the striping granularity and each divided LBA is associated with a sub-command. For example, a host write command with the starting LBA of 24 and a sector count of 16 and a striping granularity of 8 is divided into two write sub-commands; one with a starting LBA of 24 and a sector count of 8 and another with a starting LBA of 32 and a sector count of 8. The starting LBA is generally a multiple of 8, which is also the granularity of striped data across the SSDs 26.

In the case where the host provides a starting address and/or a sector count and the starting LBA is not a multiple of the striping granularity, some of the write sub-commands do not have the starting LBA address and/or the sector count of the striping granularity. Those sub-commands have to be treated in a different manner. For example, a host write command with a starting LBA of 26 and with a sector count of 18 is divided into three sub-commands; the first sub-command having a starting LBA of 26 and a sector count of 6, a second sub-command and with a starting LBA of 32 and with a sector count of 8, and a third sub-command and with a starting address of 40 and a sector count of 4. In this example, the starting LBA address and the sector count of the first write sub-command and the third write sub-command are less than the striping granularity and are accordingly treated in a different manner, as further described later.

In some embodiments, host LBAs from multiple commands are aggregated and divided into one or more sub-commands based on a striping granularity. In some embodiments, the multiple commands may have some common LBAs or consecutive LBAs. Practically, the host LBA of each command rather than the command itself is used to create sub-commands. Example of the host LBA is the combination of the starting LBA and the sector count. The host LBA of each command is aggregated, divided into one or more LBAs based on the granularity, and each divided LBA is associated to a sub-command. In an exemplary embodiment, the host LBA of a command is saved in the memory 20.

Upon receiving a write command from the host, the command and the data associated with the command to be saved in the memory 20, the storage processor 10 breaks out the received command into multiple sub-commands based on a granularity that is typically the same as, although need not be, the same as the striping granularity. The storage processor 10 or CPU subsystem 14 re-distribute the host LBAs across the bank of SSDs 26.

NVMe is a standard with a specification for accessing PCIe SSDs. NVMe is an optimized, high performance, scalable host controller interface with a streamlined register interface and command set designed for enterprise and client systems that use PCI Express SSDs. NVMe reduces latency and provides faster performance. Previously, SSDs were made using the PCIe bus, but using non-standard proprietary interfaces. By standardizing the interface of the SSDs, hosts or operating systems need only one standard driver to work with all SSDs adhering to the same specification. This also means that each SSD manufacturer does not have to allocate resources to design specific interface drivers. With the standardization of the NVMe, the PCIe SSDs are becoming readily available from many SSD manufacturers such as Micron Technology, Inc. of San Jose, Calif., Samsung, Inc. of Korea and Intel Inc. of Santa Clara, Calif. Storage systems, or appliance, can take advantage of this by employing NVMe PCIe SSDs in their system or appliance. By using a NVMe PCIe SSD, The storage system or appliance do not have to allocate resources to design their own SSD cards for use in their appliance and can use off-the-shelf SSD drives that are designed for high throughput and low latency. Using off-the-shelf NVMe PCIe SSD also lowers the cost of manufacturing the system or appliance since multiple vendors are competing to offer the similar products.

In accordance with the various embodiments and methods of the invention, the storage appliance takes advantage of SSDs readily available in the marketplace, hence saving the engineering effort currently employed in optimizing utilization of the SSDs.

In one embodiment of the invention, the storage processor 10 serves as a NVMe host for the SSDs 26. The storage processor 10 receives a command form the host 12, divides the command into sub-commands based on the number of SSDs 26 and the striping granularity, and creates the NVMe command structures for each sub-commands in the submission queues of the corresponding SSDs.

In an embodiment of the invention, the storage processor 10 receives a command and associated data form the host 12, divides the command into sub-commands and associates the sub-commands with a portion of the data ("sub-data"). A sub-data belongs to a corresponding sub-command based on the number of SSDs 26 and the granularity. The data is stored in the memory 20. Storage processor 10 creates the NVMe command structures for each sub-command in the submission queues, such as the submission queues 22, of the corresponding SSDs with each structure pointing to a sub-data.

In yet another embodiment of the invention, the data is stored in a non-volatile memory portion of the memory 20 and the storage processor 10 informs the host 12 of completion of the write command as soon as the host data is saved in the non-volatile memory.

Figure 7A:
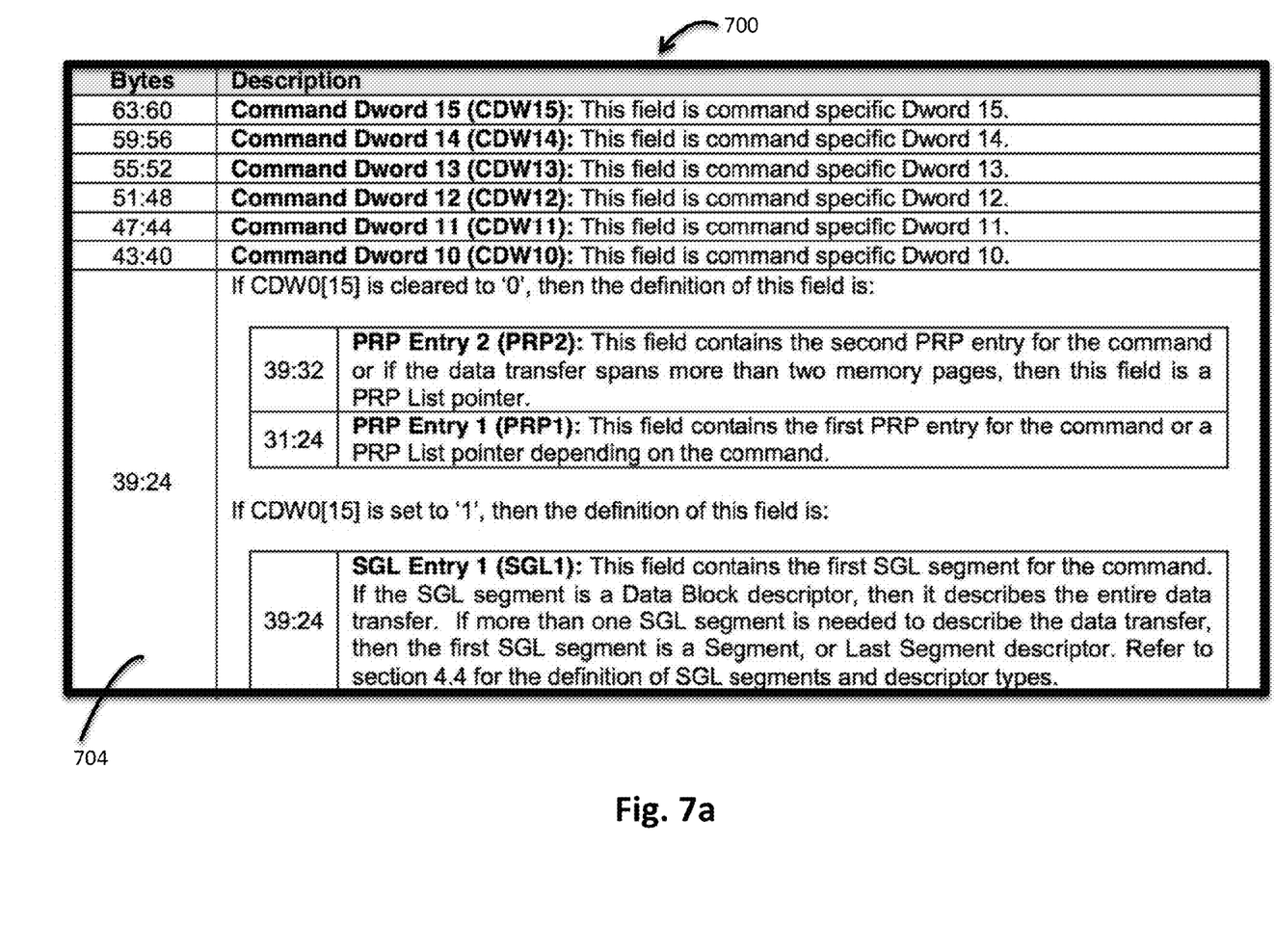
FIG. 7a shows part of the NVMe submission queue data structure bytes 24 through 62.

It is well understood by those skilled in the art that the host data or sub-data do not have to reside in contagious portions of the memory 20. The storage processor 10 may store the host data fragmented in the memory 20 and as such the sub-data associated with a sub-command may also be fragmented in the memory 20. The storage processor 10 may de-fragment the sub-data prior to creating the NVMe command structure. In the case where the sub-data fragments remain fragmented, the storage processor 10 uses a "scatter gather list", known to those in the industry and in accordance with the NVMe revision 1.1 Specification dated Oct. 11, 2012, to point to the fragmented data. An example of a scatter gather list and such a pointer is shown in FIG. 7a as "SGL Entry 1 (SGL1)" and pointer 704, respectively.

It is understood that FIG. 1 merely depicts an implementation of an embodiment of the invention and that others are contemplated. For example, the CPU subsystem 14 may be implemented using dedicated hardware and/or software.

Figure 2:
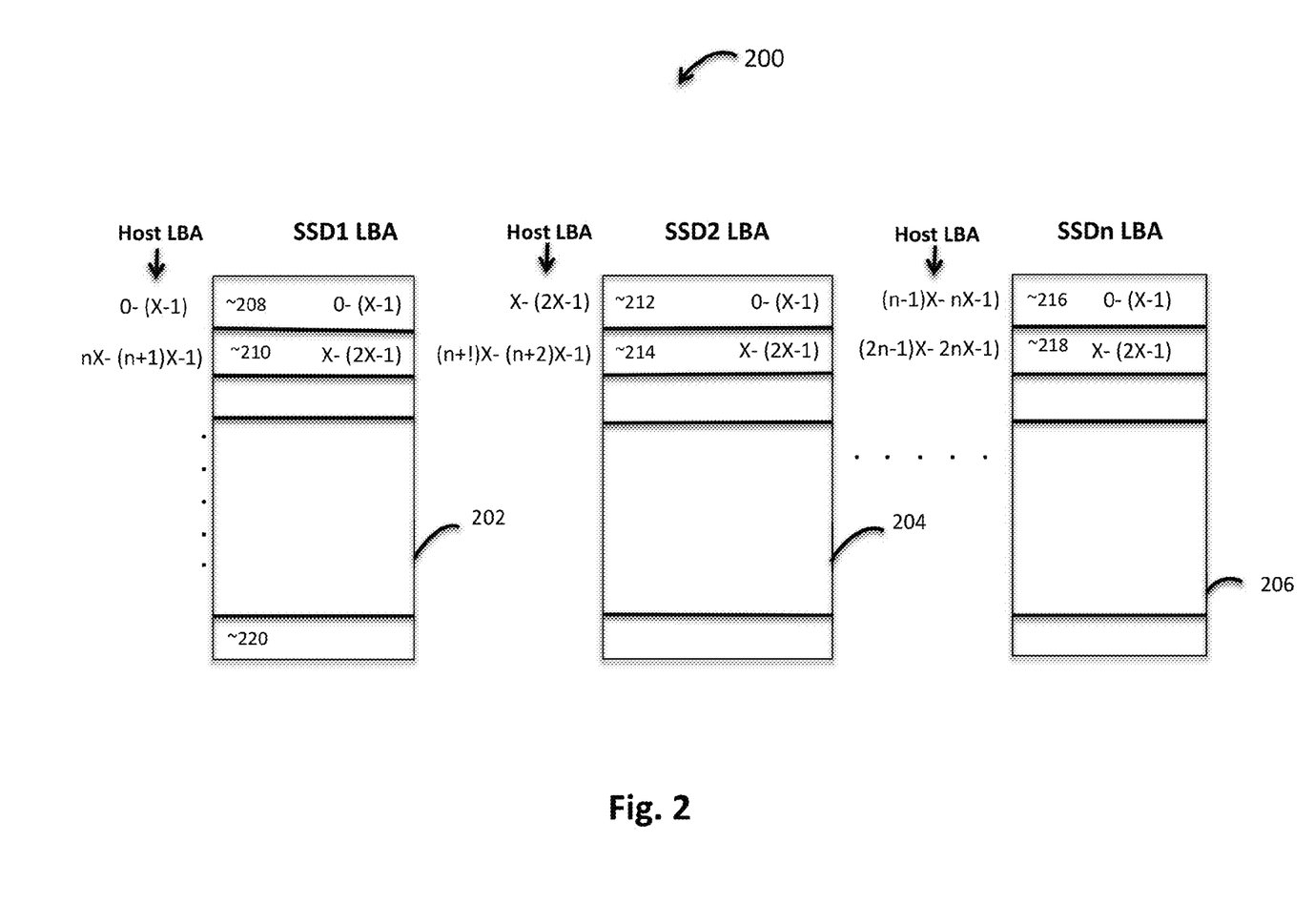
FIG. 2 shows an example of remapping of LBAs used by the storage processor 10 for assignment of host LBAs to SSD LBAs, in accordance with an exemplary embodiment of the invention.

FIG. 2 shows an example of an organization 200 of the host-LBA to SSD-LBA mapping information that the storage processor 10 uses to map host LBAs to LBAs of one or more SSDs in accordance with an exemplary embodiment of the invention. In this example, striping granularity of "X" is used. The storage processor 10 or CPU subsystem 14 maps host LBAs to particular LBAs of one or more SSDs using this information.

Upon receiving a command from the host, storage processor 10 divides the command into one or more sub-commands using the granularity of X. It then uses the starting addresses of the sub-commands and maps them to a particular SSD and LBAs within the same SSD. For example, if the LBA of a sub-command is in the "X-(2X-1)" range, the storage processor 10 maps that sub-command to LBA "0-(X-1)" 212 of SSD2, as shown in FIG. 2. If a sub-command LBA is in the "nX-((n+1)X-1)" range, the storage processor maps that sub-command to the LBA "X-(2X-1)" 210 of SSD1. In one implementation of the invention, the storage processor 10 derives mapping of the host LBAs to SSD LBAs algorithmically and as such, the storage processor 10 need not maintain any tables.

Figure 3:
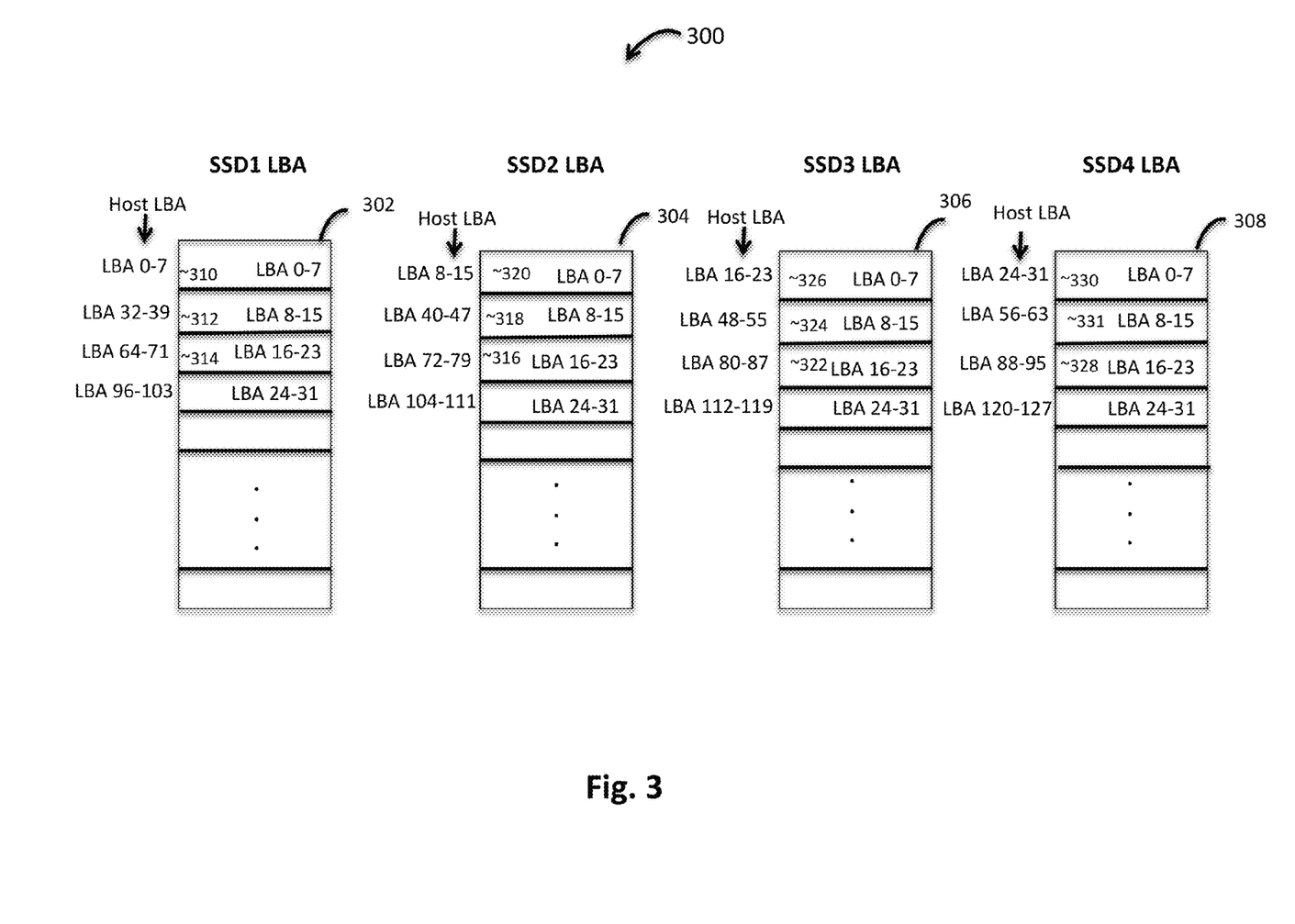
FIG. 3 shows a specific implementation of the example of the FIG. 2 showing mapping schemes used for four distinct SSDs.

For a better understanding of the tables of FIG. 2, an example is shown in subsequent figures. FIG. 3 shows an exemplary organization 300 of the information that the CPU subsystem 14 uses to map a host LBA to a particular SSD LBA, in accordance with an exemplary embodiment and method of the invention. In the embodiment of FIG. 3, four tables 300, 302-308 correspond to 4 SSDs in the array. Each table is depicted showing the mapping used by the storage processor 10 for a distinct SSD. For example, table 302 is used to map host LBAs to SSD1, table 304 is used for SSD2, table 306 is used for SSD3 and table 308 is used for SSD4. The striping granularity of 8 is used in this example. If a sub-command LBA is in the range of 40-47, the storage processor 10 maps that sub-command to LBA 8-15 318 in table 304 of SSD2. If a sub-command LBA is in the range of 88-95, the storage processor 10 maps that sub-command to LBA 16-23 328 in table 308 of SSD4. In some embodiments of the invention, the storage processor 10 can manipulate the sub-command LBA to determine the target SSD and the SSD LBA.

Figure 4:
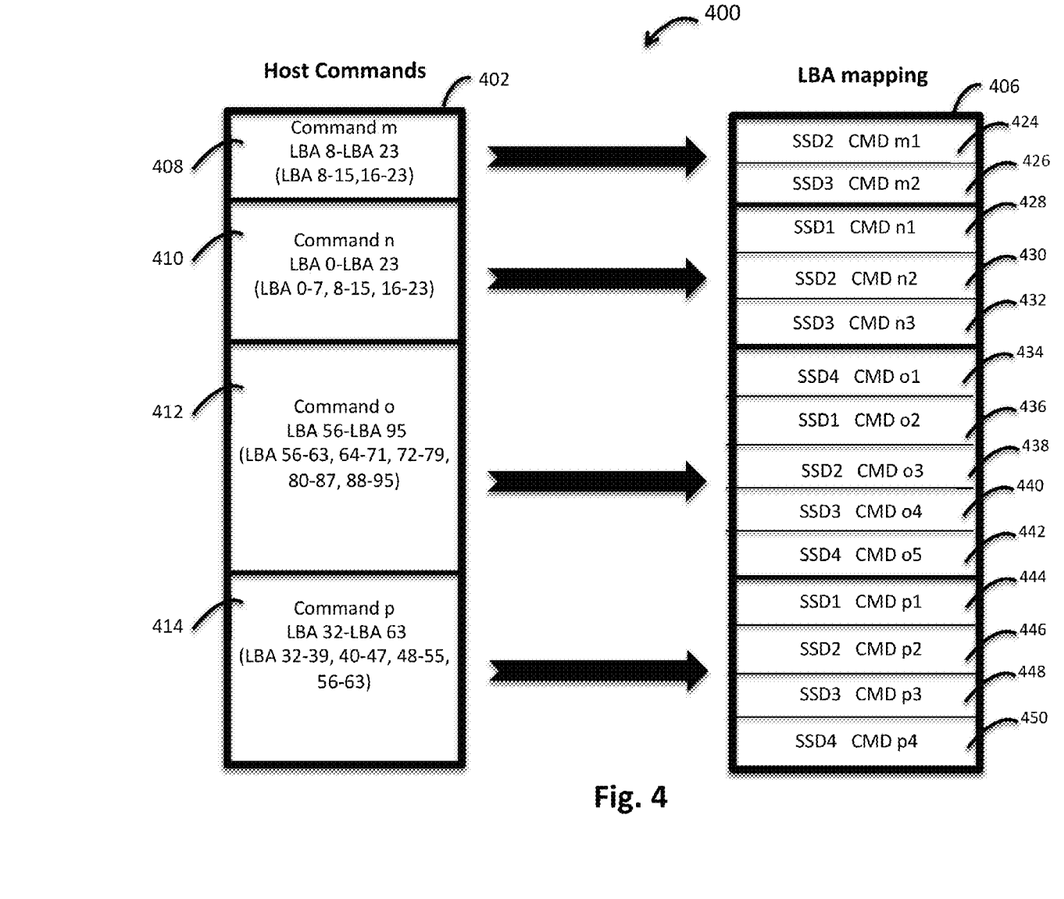
FIG. 4 shows further details of the example of FIG. 3 showing assignments of the host LBAs to SSDs based on specific implementation of example of FIG. 3.

FIG. 4 shows further details of the example of FIG. 3. More specifically, it presents dividing the host commands into sub-commands based on striping granularity of 8 and mapping the sub-commands to a SSD among the SSDs 26 and LBAs within the SSD using the example of FIG. 3. An organization 400 of two tables, tables 402 and 406, is shown in FIG. 4. The host write command table 402 is a table of write commands received from the host 12 by the storage processor 10 (of FIG. 1) and their associated LBAs. Table 406 illustrates an example of how the host commands are divided to sub-commands and striped across the SSDs 26 and how they are mapped to the SSD LBAs of FIG. 3.

The host commands "m", "n", "o", and "p", each have associated therewith LBAs. Commands are initially striped or divided into one or number of sub-commands at a granularity of the striping. Command 'm' is associated with 16 LBAs, i.e. LBAs 8-23. Because the striping is performed at a granularity of 8, the LBA associated with the command 'm' is divided into two sub-commands, 'm1' and 'm2', and striped across two SSDs, SSD2 and SSD3. Command 'n' uses 24 LBAs, which are divided into three sub-commands 'n1', 'n2', and 'n3' and striped across 3 SSDs; SSD1, SSD2, and SSD3.

Figure 5:
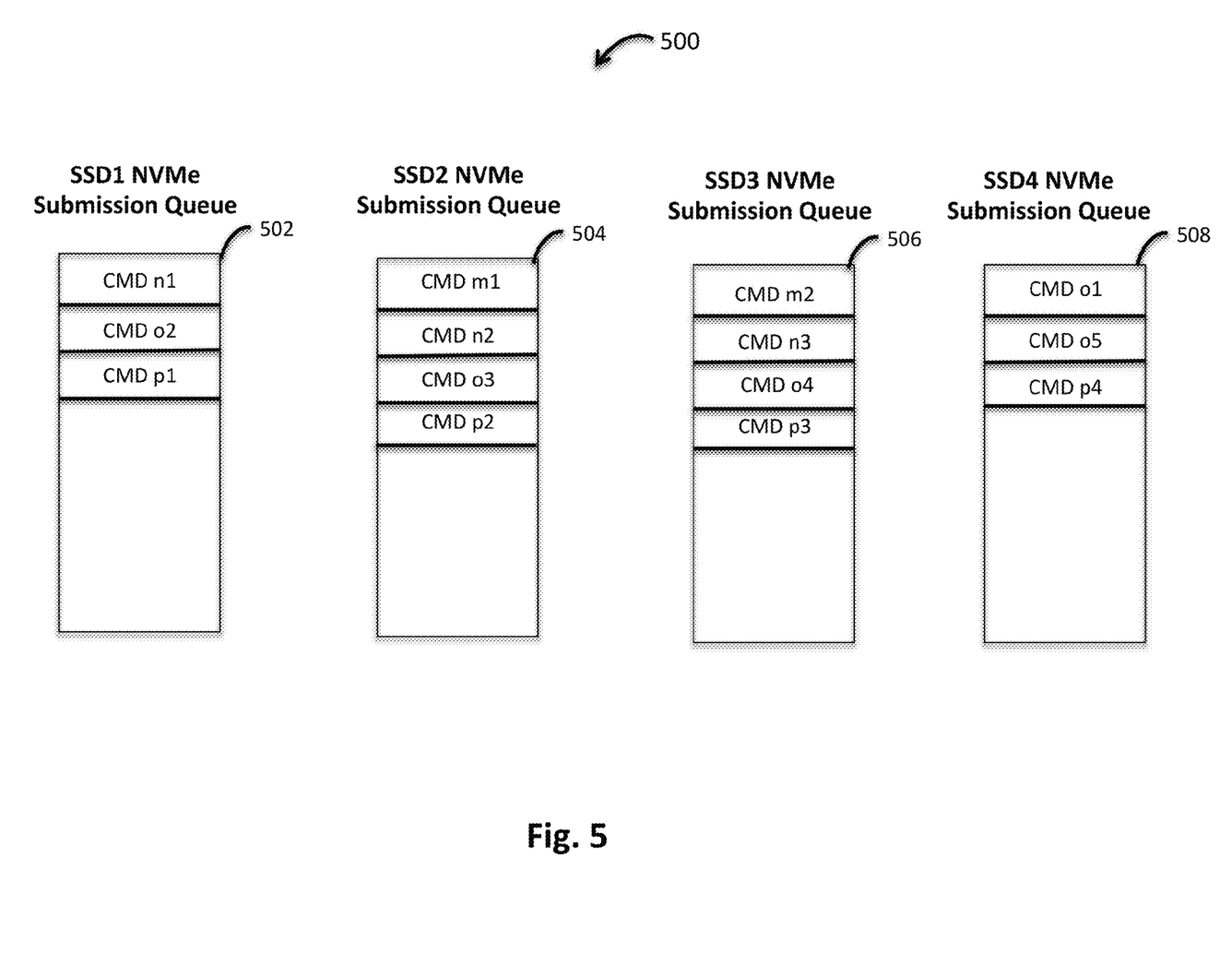
FIG. 5 shows an example of NVMe submission queue per SSD on specific implementation of example of FIG. 4.

FIG. 5 shows a set of NVMe submission queues 500 for correlating the sub-commands with SSDs using the example of FIG. 4. As shown in FIG. 5, a command is divided to sub-commands and striped across multiple SSDs based on the number of LBAs the command calls for and the granularity of striping. Thus, a command can span across multiple SSDs. As such, a single host command may be divided into multiple sub-commands targeting multiple SSDs. For example, command m is divided sub-commands m1 and m2 targeting SSD2 and SSD3, respectively. As such, m1 and m2 are included in the NVMe submission queues 504 and 506 of SSD2 and SSD3, respectively. Similarly, command n has parts in SSD1, SSD2, and SSD3 and its sub-commands are added to command queues 502, 504, and 506, respectively. In an embodiment of the invention, the queues 500 reside in the memory 20, as shown in FIG. 1. In other embodiments, the submission queues 500 reside in any suitable location of FIG. 1.

In the event the received LBAs that are associated with a host command do not align with the granularity of striping, the storage processor 10 may perform one of a few options. One option is for the storage processor to wait until it receives the remainder of the LBAs to complete the granularity and then assign the complete LBAs to a SSD and dispatch the command. Another option is the storage processor to issue a read command to a SSD that contains the host data associated with the host LBA to complete the granularity and then assign the complete LBAs to NVMe PCIe SSD and dispatch the command. Yet another option is to have the storage processor issue a partial write command to the SSD and have the SSD to merge the partial SLBA data with the remainder of the data.

Figure 6:
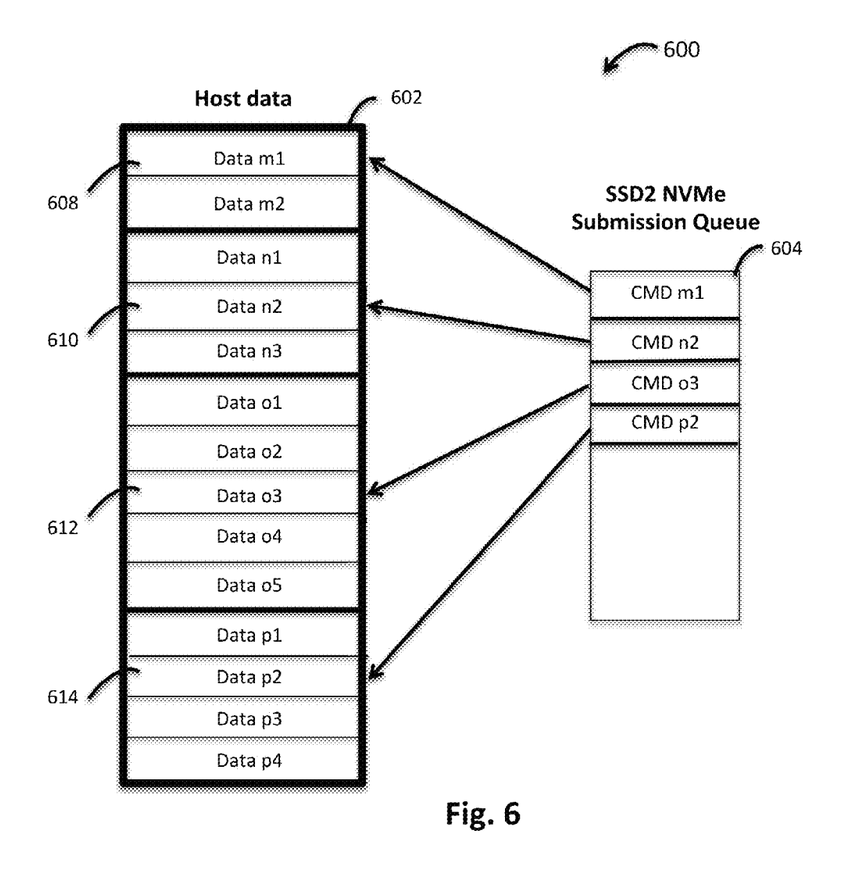
FIG. 6 shows part of the NVMe submission queue for one of the SSDs in accordance to example 5.

FIG. 6 shows the location of host data in the memory 20 for commands m, n, o, and p. Host data 602 for different commands are also accordingly divided into sub-data based on the striping granularity and assigned to their corresponding sub-commands. NVMe commands in accordance with the NVMe specification and standards are created by the storage processor 10 for each sub-command in the submission queues 22 (of FIG. 1) or 604 of the corresponding SSDs with the NVMe command structures pointing to their corresponding sub-data in the memory 20. The example of FIG. 6 further shows the SSD2 NVMe submission queue 604 with sub-data m1 608 corresponding to sub-command m1, sub-data n2 610 corresponding to sub-command n2, sub-data o3 612 corresponding to sub-command o3, and sub-data p2 614 corresponding to sub-command p2.

Figure 7B:
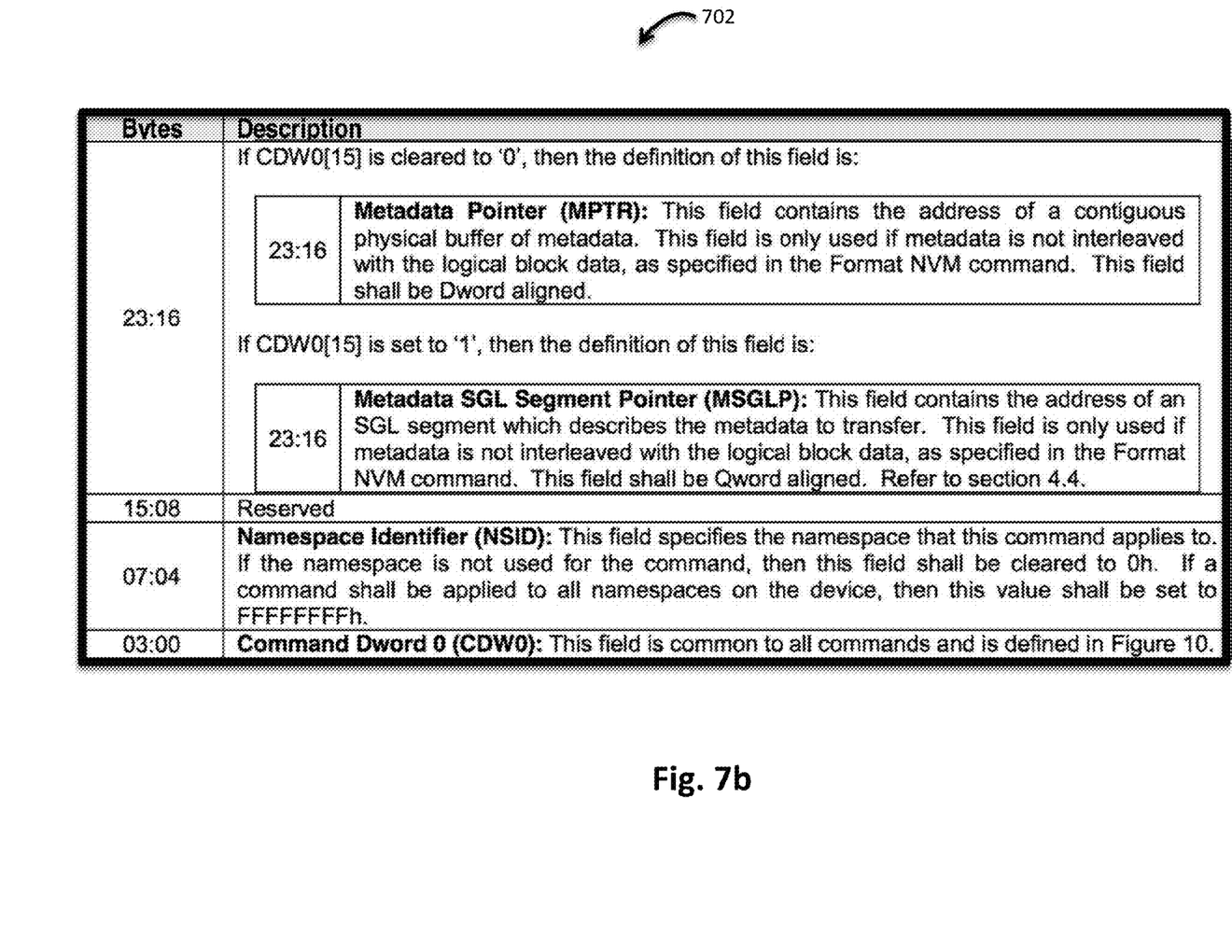
FIG. 7b shows rest of the NVMe submission queue data structure bytes 0 through 23.

FIGS. 7a and 7b depict a NVMe command structure, in accordance with the NVMe specification and standard. Storage processor 10 creates these data structures for all the sub-commands in their corresponding SSD submission queue. Bytes 24 through 39, pointed to by the pointer 704 in table 700, are used to indicate the location of the sub-data in memory 20. The NVMe PCIe SSDs uses this information to read the data corresponding to a write command or to write the data corresponding to a read command. The host data shown in table 602 does not have to be in a contiguous address space in the memory 20. The NVMe standard provides scatter/gather provision such that data corresponding to a sub-command can be staggered in different locations of the memory 20 based on space availability in the memory. The CPU subsystem 14, acting as the host for the bank of NVMe PCIe SSDs 26, creates the NVMe command structures by creating a Scatter Gather List (SGL). SGL is used to describe the data in the memory 20.

In an embodiment of the invention, the storage processor 10 attempts to minimize the scattering of the sub-data. Though scattering the data provides flexibility for the storage processor 10 to manage its memory 20, it disadvantageously creates additional processing time for the NVMe PCIe SSDs 26 to gather the list. The storage processor 10 should manage the memory allocation/de-allocation at the granularity of the sub-data to avoid creating SGL and to optimize performance of the bank of NVMe PCIe SSDs. Furthermore, eliminating or minimizing the SGL also reduces the number of memory reads the SSDs have to perform to the memory 20 for reading the list hence reducing the accesses to the memory 20.

Figure 8:
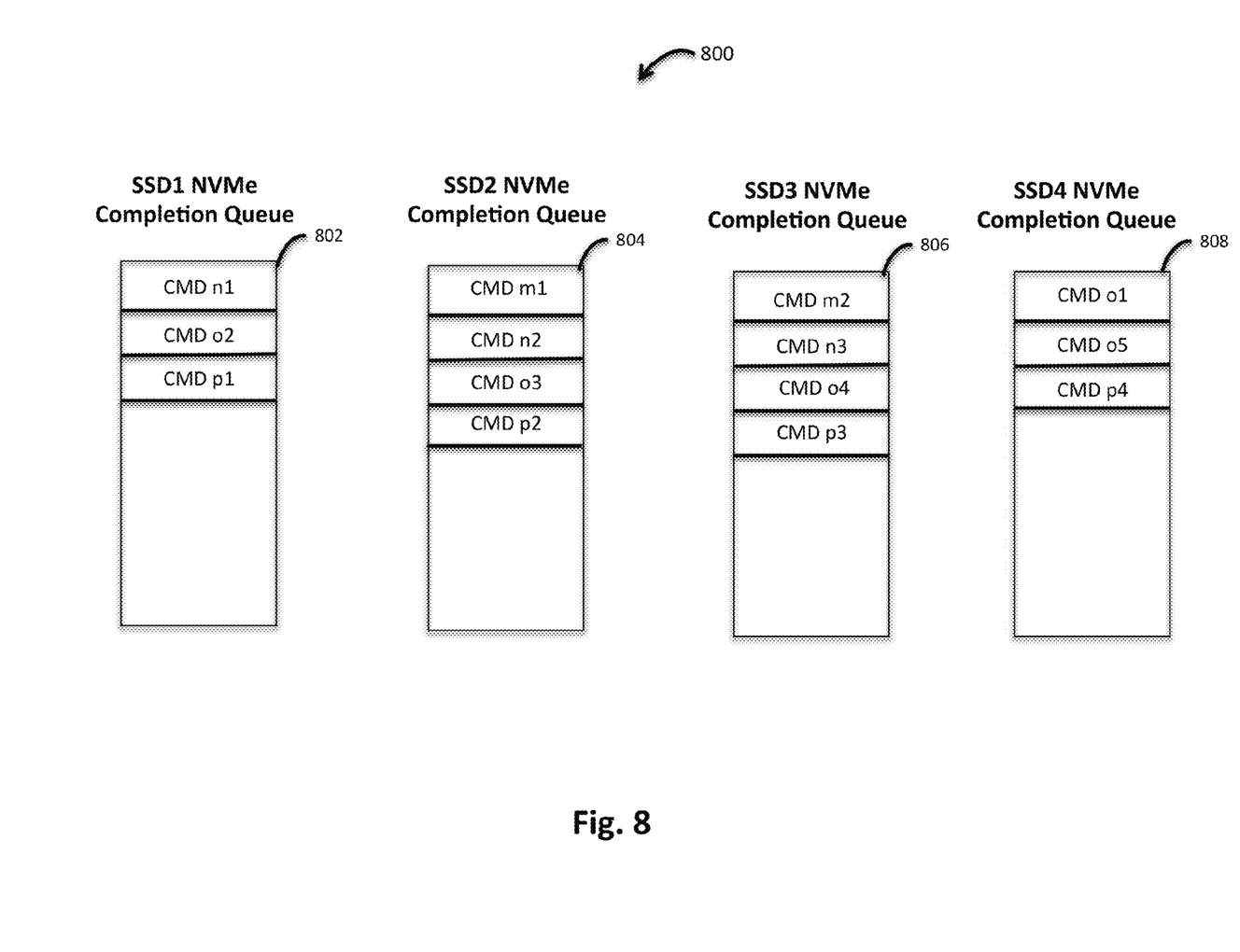
FIG. 8 shows part of the NVMe completion queue for each of the SSDs in accordance to example 5.

FIG. 8 shows an example of NVMe completion queues 800 in the memory 20. NVMe is based on paired submission and completion queue mechanism. Commands are placed by the storage processor 10 into the submission queues. Completions are placed into an associated completion queue (for example, the NVMe completion queue 24 of FIG. 1) by the SSD. Multiple submission queues may utilize the same completion queue. The completion queues are used by the bank of NVMe PCIe SSDs 26 to report the completion and status of the commands fetched by the SSDs from submission queues.

In one embodiment of the invention and in accordance with the NVMe standard, the storage processor 10 may create multiple submission and completion queues for each of the bank of NVMe PCIe SSDs 26. For example, it may maintain a separate submission queue for write and read commands.

In yet another embodiment of the invention, a round robin arbitration or weighted round robin with urgent priority class arbitration may be employed by the storage processor 10 for the NVMe PCIe SSDs to process commands from each submission queue in accordance with NVMe standards.

In one embodiment of the invention, the striping granularity matches the intended workload for which the storage system 8 is being utilized. Storage appliances are deployed in different applications requiring high performance such as, but not limited to, a mail server, databases and indexing. These applications have different workload and input/output (I/O) requirements. Smaller striping granularity may fit one workload better than the others.

Host may instruct the storage processor 10 to set the striping granularity accordingly.

In the event the data that is associated with the striping granularity does not match the flash memory page size, the storage processor 10 stores as many NVMe command structures in the submission queue of a SSD that is needed to fill the entire flash page before storing commands in the submission queue of the next SSD.

To optimize the overall performance of the individual SSDs in the bank of NVMe PCIe SSDs 26, the storage processor 10 stores as many sub-commands in each of the SSD submission queues as it takes to fill the entire flash page. Once enough sub-commands are queued for one SSD to fill its entire flash page, the storage processor dispatches the sub-commands to the SSD in accordance with the NVMe standard and queues the subsequent sub-commands for the next SSD in the bank of NVMe PCIe SSDs 26.

In some embodiments of the invention, the storage processor 10 or CPU subsystem 14 may queue enough commands for each flash memory, such as the memory 20, to perform a program page multi-plane operation to further improve the performance of the SSDs and the storage system 8. In other embodiments of the invention, storage processor 10 queues and dispatches the SSD sub-commands based on and regardless of the flash page size and allows the individual SSDs to perform the optimization.

In one embodiment of the invention, NVMe submission queues are maintained in a non-volatile portion of the memory 20. These queues retain their values in the event of power failure.

In yet another embodiment of the invention, the host data associated with a host write command is stored in the non-volatile memory portion of the memory 20. In such a case, completion of the write command can be sent to the host 12 once the data is in the memory 20 and prior to dispatching of the data to the bank of NVMe PCIe SSDs 26. This is due to the data being in a persistent memory hence the write latency being substantially reduced therefore allowing the host system to de-allocate resources that were dedicated to the write command.

In other embodiments of the invention, the storage processor 10 maintains track of a number of sub-commands corresponding to a write command. The storage processor only de-allocates the portion of the memory 20 that is allocated to the command in addition to any other resources associated with the write command. This is done upon all the sub-commands being successfully written to the bank of NVMe PCIe SSDs 26 and all the completion statuses being received by the storage processor 10.

In another embodiment of the invention, the storage processor 10 maintains track of the number of sub-commands corresponding to a host read command and only transfers the data to the host once all the data associated with the sub-commands are successfully read and transferred to a portion of the memory 20 and all the completions statuses are received by the storage processor 10.

In some embodiment of the invention, the storage processor 10 maintains an entry in a completion queue corresponding to each entry of the SSD NVMe submission queue to keep track of sub-command completion. It is understood that a command can be made of only one sub-command.

Figure 9:
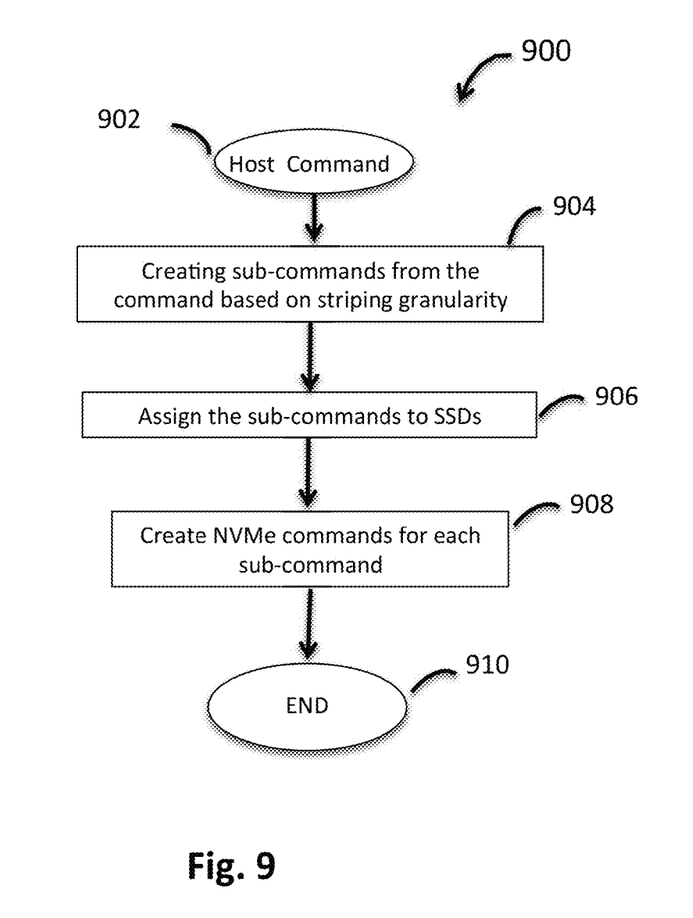
FIG. 9 shows an example of a method and apparatus for processing a host commands in SSDs in accordance with an embodiment of the invention.

FIG. 9 shows a flow chart 900 of the relevant steps performed by the storage processor 10 during a read or a write operation, in accordance with a method of the invention. At 902, a write command from the host 12 is received by the storage processor 10. Next, at step 904, the received command is divided into one or more sub-commands based on the striping granularity. Next, at step 906, the sub-commands are assigned to SSDs based on the received command. Next at step 908, the storage processor 10 creates NVMe command structures in the submission queue of corresponding SSDs for each sub-commands. The process ends at 910.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claims is:
1. A method of processing including writing to two or more solid state disks (SSDs) employed by a storage processor comprising:

receiving one or more commands from a host, the one or more commands having host logical block addresses (LBAs), a portion of the one or more commands defining a sub-command, the portion of the one or more commands excluding the host LBAs;

assigning a queue to each distinct SSD of the two of more SSDs, each queue having entries and each entry holding an unassigned SSD LBA (SLBAs), wherein each entry of each of the queues forming a stripe;

assigning a distinct unassigned SLBA of a stripe to each of a plurality of sub-commands, creating the plurality of sub-commands from the host LBA, by the storage processor, the plurality of sub-commands being associated with a command of the one or more commands and based on a striping granularity;

continuing assigning remaining sub-commands of the command to unassigned SLBAs of the stripe until the stripe includes only assigned sub-commands before starting another stripe, each of the unassigned SLBAs belonging to a different SSD of a stripe thereby causing striping across all of the SSDs of the stripe before causing striping across a next stripe, wherein the SLBAs assigned to sub-commands having no relationship to the host LBAs;

wherein a SLBA assigned to a sub-command is different from a previously-assigned SLBA of the same sub-command; and creating a Non-Volatile Memory Express (NVMe) command structure for each sub-command, by the storage processor.

2. The method of processing, as recited in claim 1, wherein host LBA is combination of a starting LBA and a sector count.

3. The method of processing, as recited in claim 2, wherein the LBAs are each divided into one or more LBAs based on the granularity, with each divided LBA being associated with a sub-command.

4. The method of processing, as recited in claim 3, further including assigning divided LBAs to SSDs.

5. The method of processing, as recited in claim 3, wherein each SSD has associated therewith a range of LBAs and one or more submission queues.

6. The method of processing, as recited in claim 5, wherein the sub-commands are saved in the one or more submission queues of the associated SSDs.

7. The method of processing, as recited in claim 6, wherein sub-commands of different commands are saved in the same submission queue.

8. The method of processing, as recited in claim 6, wherein the sub-commands of a command are saved in more than one submission queue.

9. The method of processing, as recited in claim 1, further including receiving data associated with the one or more commands from the host.

10. The method of processing, as recited in claim 9, further including dividing the data into one or more sub-data based on the granularity, with each sub-data being associated with a sub-command.

11. The method of processing, as recited in claim 1, wherein the storage processor acts as a host to the SSDs.

12. The method of processing, as recited in claim 1, wherein the SSDs are NVMe PCIe SSDs.

13. The method of processing, as recited in claim 1, wherein the method of processing includes reading the one or more solid state disks (SSDs) employed by the storage processor.

14. The method of processing, as recited in claim 1, wherein the storage processor includes memory and the memory includes non-volatile memory.

15. The method of processing, as recited in claim 14, wherein the memory further including submission queues.

16. The method of processing, as recited in claim 15, further including maintaining the submission queues in the non-volatile memory.

17. The method of processing, as recited in claim 15, further including data associated with the one or more commands and sent by the host, wherein maintaining the data in the memory.

18. The method of processing, as recited in claim 17, further including maintaining the data in the non-volatile memory.

19. The method of writing, as recited in claim 1, further including aggregating the accompanying information of each command.

20. A storage system comprising:

a storage processor including a memory and configured to read from or write to two or more solid state disks (SSDs) and operable to:

receiving one or more commands from a host, the one or more commands having host logical block addresses (LBAs), a portion of the one or more commands defining a sub-command, the portion of the one or more commands excluding the host LBAs;

assigning a queue to each distinct SSD of the two of more SSDs, each queue having entries and each entry holding an unassigned SSD LBA (SLBAs), wherein each entry of each of the queues forming a stripe;

assigning a distinct unassigned SLBA of a stripe to each of a plurality of sub-commands, creating the plurality of sub-commands from the host LBA, by the storage system, the plurality of sub-commands being associated with a command of the one or more commands and based on a striping granularity;

continuing assigning remaining sub-commands of the command to unassigned SLBAs of the stripe until the stripe includes only assigned sub-commands before starting another stripe, each of the unassigned SLBAs belonging to a different SSD of a stripe thereby causing striping across all of the SSDs of the stripe before causing striping across a next stripe, wherein the SLBAs assigned to sub-commands having no relationship to the host LBAs;

wherein a SLBA assigned to a sub-command is different from a previously-assigned SLBA of the same sub-command; and creating a Non-Volatile Memory Express (NVMe) command structure for each sub-command.

21. The storage system, as recited in claim 20, wherein at least a portion of the memory is non-volatile memory.

22. The storage system, as recited in claim 21, wherein the host LBA is a starting LBA and a sector count.

23. The storage system, as recited in claim 22, wherein the storage processor is operable to receive data associated with the one or more commands.

24. The storage system, as recited in claim 23, wherein the storage processor further includes a CPU subsystem operable to receive the LBAs and the data from the host, the CPU subsystem being configured to divide the LBAs into one or more LBAs and to divide the data into one or more sub-data based on the granularity, with each divided LBA and sub-data being associated with a sub-command.

25. The storage system, as recited in claim 20, wherein each SSD has associated therewith a range of LBAs and one or more sub-commands.

26. The storage system, as recited in claim 24, wherein the memory includes one or more submission queues for each SSD and the sub-commands are saved in the submission queues of the associated SSDs.

27. The storage system, as recited in claim 26, wherein the submission queues are maintained in the non-volatile memory.

28. The storage system, as recited in claim 23, wherein the data is maintained in the non-volatile memory.

29. The storage system, as recited in claim 20, wherein the storage processor acts as a host to the one or more SSDs.

30. The storage system, as recited in claim 20, wherein the storage processor includes a CPU subsystem and wherein the CPU subsystem includes a CPU, dedicated hardware, or software.

* * * * *